V. J. QUINN & W. E. ARNDT.
VALVE.
APPLICATION FILED JULY 25, 1910.
997,090.
Patented July 4, 1911.
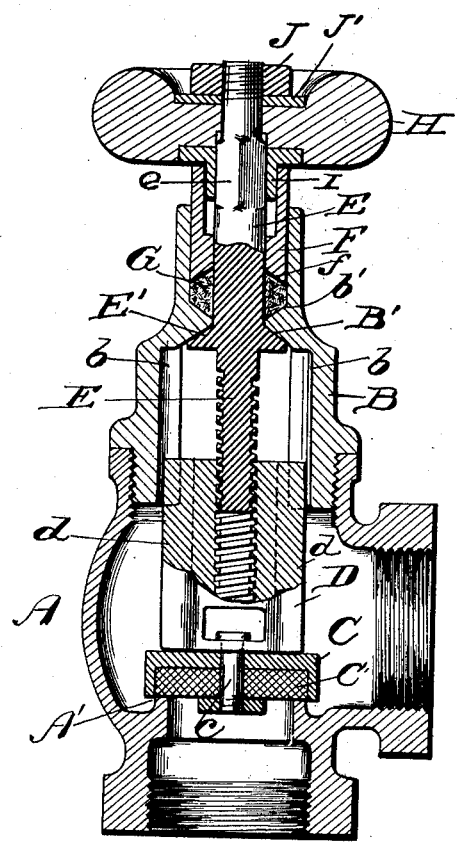

UNITED STATES PATENT OFFICE.

VINCENT J. QUINN AND WILLIAM E. ARNDT, OF DETROIT, MICHIGAN, ASSIGNORS OF ONE-FOURTH TO BENJAMIN H. HICKEY, OF DETROIT, MICHIGAN.

VALVE.

997,090.      Specification of Letters Patent.      Patented July 4, 1911.

Application filed July 25, 1910. Serial No. 573,777.

*To all whom it may concern:*

Be it known that we, VINCENT J. QUINN and WILLIAM E. ARNDT, citizens of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

Our invention relates to an improvement in valves, shown in the accompanying drawings and more particularly pointed out in the following specification and claim.

The object of our invention is to construct a valve adapted for use on either direct pressure or vacuum systems,—the construction being such that an absolutely tight joint is assured around the valve stem whether employed on direct pressure or vacuum.

Other advantages and improvements will hereafter appear.

The drawing shows a central vertical section through the valve with parts broken away and in elevation.

Referring now to the letters of reference placed upon the drawing: A is the body of the valve provided with the usual seat A'.

B is the valve bonnet having a screw-threaded connection with the valve body and provided with a flange seat B' formed in the wall of its upwardly projecting neck.

C is the valve carrying the usual composition disk C'.

D is a traveling block provided with projecting ribs $d$ straddling the guides $b$ extending from the inner wall of the bonnet.

$c$ is a bolt by means of which the valve is loosely connected with the traveling block.

E is the valve stem having a screw-threaded connection at its lower end with the traveling block D and provided with a projecting flange E'.

F is a follower loosely sleeved on the valve stem E having an angularly formed lower face $f$.

G denotes elastic metallic packing surrounding the valve stem and resting on the angularly formed inwardly projecting wall $b'$ of the valve bonnet.

H is an operating handle having a projecting ferrule I, provided with a squared opening designed to engage the squared portion $e$ of the valve stem.

J is a nut having a screw-threaded engagement with the upper end of the valve stem, and J' is a washer deposed between the nut and the operating handle H.

Having indicated the several parts by reference letters, the construction and operation of the valve will be readily understood.

In assembling the parts the screw-threaded portion of the stem is first engaged with the traveling block, the stem is then inserted through the opening in the valve bonnet from the underside;—the wings of the traveling block straddling the guides $b$, thereby securing the block against rotation upon the stem. The metallic elastic packing is then placed in position, and the loose follower F inserted over the stem. The operating handle is engaged by the stem and the nut J adjusted so as to draw the flange E' to its seat,—the beveled under-face of the follower crowding the packing toward the stem.

It will be seen that upon operating the handle the valve C may be raised or lowered due to the reciprocating movement of the screw-threaded traveling block D upon the stem,—with which the valve is loosely connected,—while the flange E', held to its seat by the nut J, insures a steam tight joint around the stem.

When employing the valve upon a direct pressure system, the pressure of the steam against the underside of the flange E' will assist in forcing it to its seat, thereby insuring a tight joint at this point. If employed on a vacuum system the tendency of the vacuum to draw the flange E' from its seat will force the follower F against the packing due to the pressure of the operating handle thereon, in turn connected with the valve stem. The metallic elastic packing is by this means crowded toward the stem, a tight joint being secured to protect the vacuum. Thus the device is equally well adapted for employment under a vacuum or direct pressure system,—a tight joint being assured in either case.

It will be readily understood that in the present construction the expansion and contraction of the metals will not result in the flange being bound to its seat making it difficult or impossible to operate the valve proper, as the elasticity of the metallic packing will relieve any tendency of this character,—the objection to devices employing a flange on the stem in which adjusting nuts have been provided to force and hold it to its seat. So also it will be seen that a tight joint is assured when employed on a vacuum system even though the flange may be drawn slightly from its seat,—the elastic metallic packing being thereby compressed by the action of the follower so as to insure a tight joint around the stem.

We are aware that springs have been employed on valves of this type to force the flange to its seat,—the use of which avoids the tendency of the flange to bind upon the seat due to the expansion and contraction of the metals. Valves of this character however, have been found impractical when working under vacuum as the action of the vacuum has a tendency to raise the flange from its seat, the spring being compressed through the action of the vacuum which is thereby destroyed.

While we have shown this invention as applied to steam valves, it is equally well adapted for use on other types.

Having thus described our invention, what we claim is:—

In a device of the class described, a body portion, a valve, a valve stem provided with a projecting flange having an upper beveled face adapted to be seated in the wall of the body portion, said stem provided with a screw-threaded lower portion and a rectangular upper portion, a traveling block engaging said screw-threaded portion adapted to reciprocate thereon, means for engaging the valve with the traveling block, an elastic metallic packing having a beveled upper and lower face supported within an annular wall formed in the body portion to receive it, a follower loosely sleeved on the stem provided with a lower beveled face adapted to bear against the packing, said follower having an upper annular wall spaced from the stem to receive the end of a ferrule, an operating handle provided with the projecting ferrule having a central rectangular opening to receive the rectangular portion of the stem, the ferrule of said operating handle adapted to bear directly against the end of the follower, and an adjustable nut engaging the end of the stem and bearing against said handle to hold it in non-elastic relation with the end of the follower whereby the flange on the valve stem may be drawn to its seat, and the packing compressed through the action of the follower when working under vacuum.

In testimony whereof, we sign this specification in the presence of two witnesses.

VINCENT J. QUINN.
WILLIAM E. ARNDT.

Witnesses:
GRACE E. WYNKOOP,
SAMUEL E. THOMAS.

Copies of this patent may be obtained for five cents each, by addressing the "Commissioner of Patents, Washington, D. C."